US008891407B2

(12) United States Patent
Collins et al.

(10) Patent No.: US 8,891,407 B2
(45) Date of Patent: Nov. 18, 2014

(54) CONNECTIVITY MANAGEMENT AND DIAGNOSTICS FOR CELLULAR DATA DEVICES

(71) Applicant: Jasper Technologies, Inc., Mountain View, CA (US)

(72) Inventors: Daniel G. Collins, McKinney, TX (US); Curtis Govan, McKinney, TX (US); Amit Gupta, Livermore, CA (US); Carl Keller, Danville, CA (US); Rakesh Kumar, Sunnyvale, CA (US); Suparna Kumar, San Jose, CA (US); Jahangir Mohammed, Saratoga, CA (US); Scott Potter, Los Gatos, CA (US)

(73) Assignee: Jasper Technologies, Inc., Mountain View, CA (US)

( * ) Notice: Subject to any disclaimer, the term of this patent is extended or adjusted under 35 U.S.C. 154(b) by 0 days.

(21) Appl. No.: 14/273,380

(22) Filed: May 8, 2014

(65) Prior Publication Data

US 2014/0241169 A1 Aug. 28, 2014

Related U.S. Application Data

(63) Continuation of application No. 12/315,179, filed on Nov. 26, 2008, now Pat. No. 8,730,842.

(60) Provisional application No. 61/004,655, filed on Nov. 29, 2007.

(51) Int. Cl.
| | | |
|---|---|---|
| *H04L 12/28* | (2006.01) | |
| *H04L 12/24* | (2006.01) | |
| *H04W 24/02* | (2009.01) | |
| *H04W 8/22* | (2009.01) | |
| *H04W 8/30* | (2009.01) | |
| *H04W 24/08* | (2009.01) | |

(52) U.S. Cl.
CPC .......... *H04L 41/0869* (2013.01); *H04W 24/02* (2013.01); *H04W 8/22* (2013.01); *H04W 8/30* (2013.01); *H04W 24/08* (2013.01)
USPC ......................................... 370/255

(58) Field of Classification Search
CPC .................................................. H04L 41/0869
USPC ........................................................ 370/255
See application file for complete search history.

(56) References Cited

U.S. PATENT DOCUMENTS 6,526,033 B1 * 2/2003 Wang et al. ................... 370/338
6,738,634 B1 5/2004 Shin
(Continued)

FOREIGN PATENT DOCUMENTS

EP 1229751 A1 8/2002
EP 1392077 A1 2/2004
(Continued)

*Primary Examiner* — Wei Zhao
(74) *Attorney, Agent, or Firm* — Blakely Sokoloff Taylor & Zafman

(57) ABSTRACT

A cellular network device comprises a data network indicator and an automatic network reconfiguration module. A data network indicator provides an indication when data network connectivity associated with a cellular network does not meet performance or configuration criteria. An automatic network reconfiguration module automatically reconfigures network data connectivity in the event that an indication has been provided that data network connectivity does not meet performance or configuration criteria. A cellular network device comprises a data network indicator and a management channel. A data network indicator for providing an indication when data network connectivity associated with a cellular network does not meet performance or configuration criteria. A management channel for enabling automatic access in the event that an indication is received that data network connectivity does not meet performance or configuration criteria, wherein the management channel enables automatic access to the cellular network device for administrative maintenance or reporting.

6 Claims, 7 Drawing Sheets

(56) References Cited

U.S. PATENT DOCUMENTS

| | | |
|---|---|---|
| 7,552,222 B2 | 6/2009 | Garimella et al. |
| 2003/0157935 A1 | 8/2003 | Kauhanen |
| 2004/0097230 A1 | 5/2004 | Natarajan et al. |
| 2005/0020240 A1 | 1/2005 | Minter |
| 2005/0101351 A1 | 5/2005 | Lee et al. |
| 2006/0019647 A1 | 1/2006 | Muhonen et al. |
| 2006/0128389 A1 | 6/2006 | Hurtta |
| 2006/0153124 A1 | 7/2006 | Kant et al. |
| 2006/0173976 A1 | 8/2006 | Vincent et al. |
| 2007/0005201 A1 | 1/2007 | Chenn |
| 2007/0019670 A1* | 1/2007 | Falardeau ............. 370/465 |
| 2007/0026861 A1 | 2/2007 | Kuhn et al. |
| 2007/0060124 A1 | 3/2007 | Kalavade |
| 2007/0275728 A1 | 11/2007 | Lohr et al. |
| 2008/0165751 A1 | 7/2008 | Soininen et al. |
| 2009/0279506 A1 | 11/2009 | Sinnreich et al. |

FOREIGN PATENT DOCUMENTS

| | | |
|---|---|---|
| EP | 1672945 A1 | 6/2006 |
| GB | 2389745 A | 12/2003 |
| WO | 01/37602 A1 | 5/2001 |

* cited by examiner

CONNECTIVITY MANAGEMENT AND DIAGNOSTICS FOR CELLULAR DATA DEVICES

CROSS REFERENCE TO OTHER APPLICATIONS

This application claims priority to U.S. patent application Ser. No. 12/315,179 filed on Nov. 26, 2008 which is the Non-Provisional filing of U.S. Provisional Patent Application No. 61/004,655 entitled ENHANCED PROVISIONING FOR COMMUNICATION SYSTEMS WITH USER ACCESSIBLE INPUT INTERFACES filed Nov. 29, 2007 which is incorporated herein by reference for all purposes.

BACKGROUND OF THE INVENTION

Cellular wireless networks commonly provide both voice and data capability. A data communications layer is typically overlaid onto the voice communications layer, while utilizing the same network. For example, cellular devices utilizing the global system for mobile communications (GSM) voice standard are able to use the general packet radio service (GPRS) layer of the network for data communications. In these systems, a cellular device must register separately for the voice and the data networks. Protocols for network selection and registration were designed for human users primarily using voice communications, and in some instances these protocols require manual reconfiguration if there is a problem with or a different selection is desired for the data network. However, a problem arises in the event that a manual configuration, correction, or other input is required to correct a problem with the data network and there is no one available to provide the manual configuration, correction, or other input.

BRIEF DESCRIPTION OF THE DRAWINGS

Various embodiments of the invention are disclosed in the following detailed description and the accompanying drawings.

DETAILED DESCRIPTION

Figure 1:
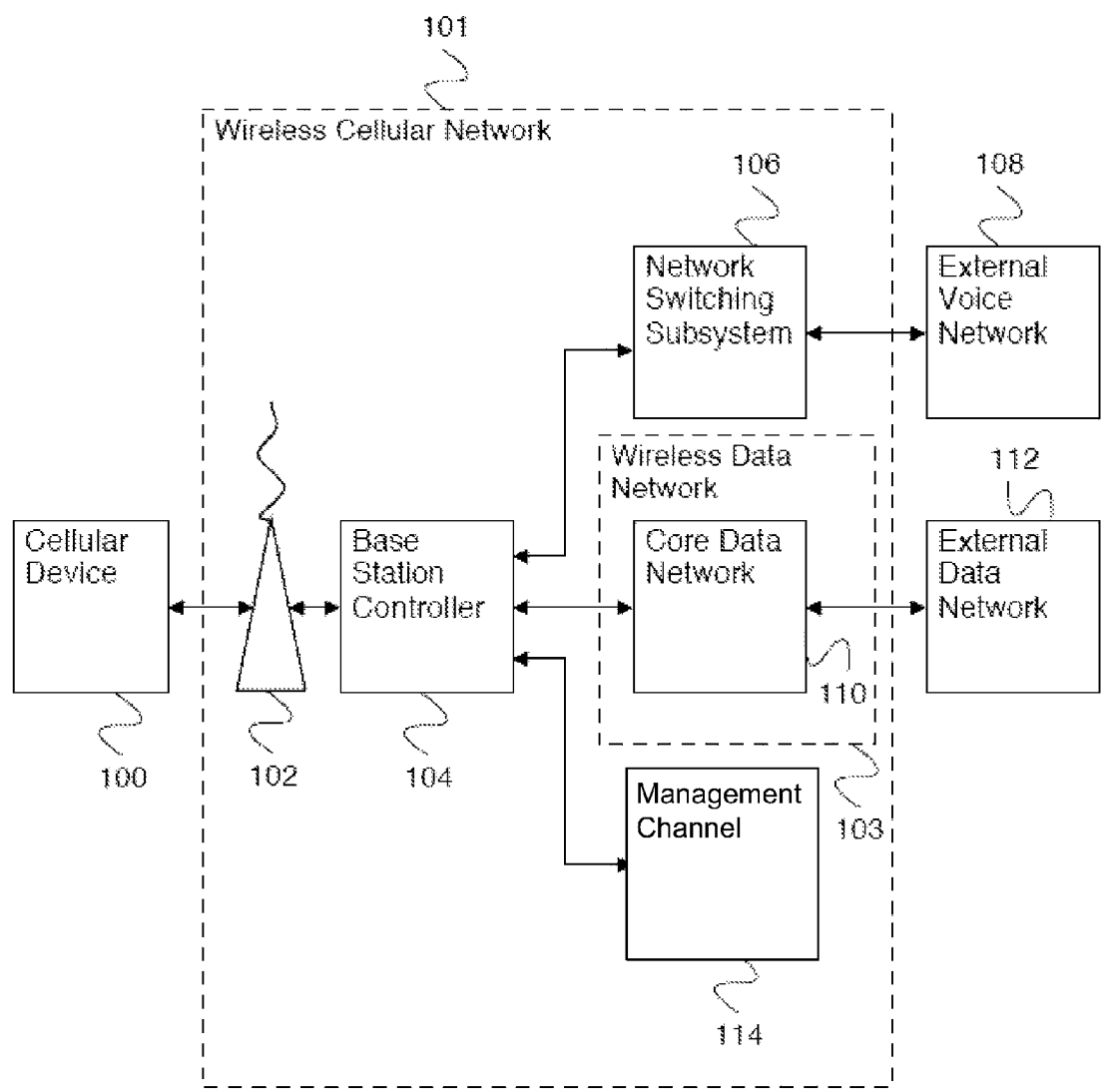
FIG. 1 is a block diagram illustrating an embodiment of a wireless cellular network with data network overlay.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic network reconfiguration of cellular data devices is disclosed. A software module is added to the standard control software of a cellular device to automatically detect and react to various failure modes of the data network. Data network failure modes include no data layer present on the current cellular network, device failure to register on the data layer, no connectivity between the cellular data network and the Internet, unacceptably slow data transfer, or any other appropriate failure modes. In some embodiments, the automatic reconfiguration software module maintains a list of backup data and voice networks and is capable of reinitializing registration to different networks until a satisfactory connection is established. In some embodiments, the automatic reconfiguration software module includes the capability to communicate with a software vendor over a specially designated management channel in the event that the automatic reconfiguration process is unsuccessful, or to perform regular maintenance and updates to the reconfiguration process or backup network lists. In various embodiments, the management channel is used for subscription management (e.g., as the first use to establish subscription parameters—for example, to start a laptop device or a personal navigation device subscription to a network, to start service, to start payment, after a subscription has been deactivated—for example, for a predetermined period the management channel is active even after subscription deactivation, etc.), diagnostic purposes (e.g., determining the cause of failure for communication in a data and/or voice mode—for example, a billing issue, a subscription limitation, a software issue, a lack of hardware issue in the event that the management channel can connect but a regular service is not available for other reasons, etc.), or any other appropriate use for a management channel. In various embodiments, a management channel uses: a dedicated end-point identifier (e.g., a dedicated management channel access point name (APN)), an alternate transport protocol (e.g., short messaging system (SMS), Unstructured Supplementary Service Data (USSD), Cell Broadcast Service (CBS), voice channel, circuit switched data (CSD), etc.), a supplementary service manipulation (e.g., a call forwarding registration, message forwarding registration, etc.), or any other appropriate system or service.

In some embodiments, management channel communications comprise location data (e.g., global positioning system (GPS) information or GSM correlation information). In some embodiments, management channel communications include diagnostic or network diagnostic information (e.g., poor signal or coverage at location X at time Y, etc.).

In some embodiments, a configuration criterion comprises a device first customer use criteria wherein the management channel performs subscription management for first use by a customer—for example, registers a new customer, arranges payment method (e.g., credit card), etc.

In some embodiments, an alternate network selection is made based on service availability—for example, a device can decide to select an alternative network based on availability or otherwise of available services on a preferred network. In some embodiments, the alternative network is chosen based on the preferred network's inability to provide service on a transient or semi-permanent basis. In some embodiments, the ability to select an alternate network is based on the inability of the preferred network to provide a desired service—for example, a GSM network carrier is unable to continuously provide data service even though voice service is acceptable, an alternate network carrier is selected for both voice and data services. In some embodiments, a voice service is not acceptable for a given network carrier and the carrier is selected based on its associated data network acceptability.

In some embodiments, connection management selects a network or changes the selection of a network based on a configuration (e.g., overriding the default automated network selection). In some embodiments, the selection is changed (e.g., a new network connection is established) even though the current network communication performance is adequate—for example, based on cost or other business preference parameters. In various embodiments, the connection management logic is encapsulated in a library or a service called by an application, a device call, or by device driver software, or any other appropriate manner of encapsulating connection manager logic.

In some embodiments, device-side or client-side code automatically executes a network selection using policies (e.g., a policy that is different than the standard GSM protocols that require a manual intervention). In some embodiments, the client-side code collaborates with server-side code (potentially off-line) to get updated policy preferences as well as for reporting/logging purposes.

FIG. 1 is a block diagram illustrating an embodiment of a wireless cellular network with data network overlay. In the example shown, cellular device 100 comprises a communications device that uses wireless cellular network 101 and wireless data network 103. In some embodiments, wireless cellular network 101 comprises a global system for mobile communications (GSM) network and wireless data network 103 comprises a general packet radio service (GPRS) network. In some embodiments, cellular network 101 and data network 103 comprise a cellular network and a data network other than a GSM network and a GPRS network. In some embodiments, cellular device 100 enables automatic network reconfiguration. For example, in the event that cellular device 100 has an interaction with a data portion of the network (e.g., wireless data network 103) that is not adequate or does not meet a performance criterion or does not meet business criteria (e.g., cost) or configuration criteria (e.g., a preferred network ordering, overall usage agreement, etc.), then cellular device 100 is capable of automatically (e.g., without manual input) joining a different wireless cellular network and/or wireless data network. In various embodiments, cellular device 100 comprises a cellular telephone, a mobile smartphone with data transfer capability, a mobile data communications device, a network interface for a wireless data processing device, a laptop, a personal navigation device (PND), or any other appropriate mobile communications device.

Wireless cellular network 101 allows a user of cellular device 100 to engage in voice communications with devices accessed through voice network 108 and data communications with devices accessed through data network 112. Cellular device 100 communicates with wireless cellular network 101 via cellular base station 102. Base station 102 contains a radio transmitter and receiver for communicating with cellular devices (e.g., cellular device 100) and a communications system for communicating with base station controller 104. Base station controller 104 controls base station 102 and enables communication with voice network 108 via network switching subsystem 106 and with data network 112 via GPRS core network 110. In various embodiments, base station controller controls one base station, two base stations, ten base stations, or any other appropriate number of base stations. Network switching subsystem 106 controls voice network switching, maintains a register of cellular device locations, and connects the GSM network with voice network 108. Voice network 108 is a voice telephony network for connecting various voice telephony devices. In various embodiments, voice telephony network 108 comprises a public switched telephone network, a private voice telephony network, or any other appropriate voice telephony network. By enabling cellular device 100 to connect to voice network 108, a user of cellular device 100 is able to have a verbal conversation with another user of a device that is directly or indirectly connected to voice network 108 (e.g., a cell phone user, a wired telephone user, a internet telephone user—for example, a voice over internet protocol user). For example, a user can use cellular device 100 to make a telephone call to someone. Core data network 110 controls data communications switching and connects cellular network 101 with data network 112. Data network 112 comprises a data communications network for connection various data communications devices. Data network 112 comprises one or more of the following: a local area network, a wide area network, a wired network, a wireless network, the Internet, a fiber network, a storage area network, or any other appropriate network enabling communication. By enabling cellular device 100 to connect to data network 112, a user of cellular device 100 or cellular device 100 itself can interact with other devices or servers or applications running on other devices or servers via data network 112. For example, cellular device 100 can contact a server to inquire about a transaction (e.g., a credit card authorization for a purchase).

Wireless cellular network 101 of FIG. 1 additionally comprises management channel 114, in parallel with the connections to voice network 108 and data network 112. In various embodiments, cellular device 100 accesses management channel 114 to download information about alternative networks for automatic network reconfiguration, to update account information, to upload cellular device usage information or other information, to download updated software for cellular device 100, to download recovery information in the event of network loss, or to perform any other appropriate function. In some embodiments, management channel 114 is part of network switching subsystem 106 or GPRS core network 110, and information transmitted using management channel 114 is indicated to be distinct from normal network traffic. Information transmitted using management channel 114 is marked as privileged and is transmitted even when the connection from cellular device 100 through network switching subsystem 106 or GPRS core network 110 is in a disconnected state (e.g., cellular device 100 has communicated with tower 102 and base station controller 104, but not been authenticated to communicate with voice network 108 or data network 112). In various embodiments, privileged transmissions are marked by one or more of the following: changing the subscriber identity of cellular device 100, by changing the access point name cellular device 100 connects to, by changing the user name cellular device 100 connects with, by indicating a specific set of destinations (e.g., internet protocol (IP) addresses) devices can connect to and have their transmissions automatically marked as privileged, by marking any transmission from a particular cellular device in a disconnected state as privileged and rerouting it to a specific destination (e.g., a specific APN), or by using any other appropriate technique for marking privileged transmissions. In various embodiments, management channel 114 is used for diagnostics, for connection management, for subscription management, or any other appropriate usage.

In various embodiments, the management channel is used for subscription management (e.g., as the first use to establish subscription parameters—for example, to start a laptop device or a personal navigation device subscription to a network, to start service, to start payment, after a subscription has been deactivated—for example, for a predetermined period the management channel is active even after subscription deactivation, etc.), diagnostic purposes (e.g., determining the cause of failure for communication in a data and/or voice mode—for example, a billing issue, a subscription limitation, a software issue, a lack of hardware issue in the event that the management channel can connect but a regular service is not available for other reasons, etc.), or any other appropriate use for a management channel. In various embodiments, a management channel uses: a dedicated endpoint identifier (e.g., a dedicated management channel access point name (APN)), an alternate transport protocol (e.g., short messaging system (SMS), Unstructured Supplementary Service Data (USSD), Cell Broadcast Service (CBS), voice channel, circuit switched data (CSD), etc.), a supplementary service manipulation (e.g., a call forwarding registration, message forwarding registration, etc.), or any other appropriate system or service.

In some embodiments, management channel communications comprise location data (e.g., global positioning system (GPS) information or GSM correlation information). In some embodiments, management channel communications include diagnostic or network diagnostic information (e.g., poor signal or coverage at location X at time Y, etc.).

Figure 2:
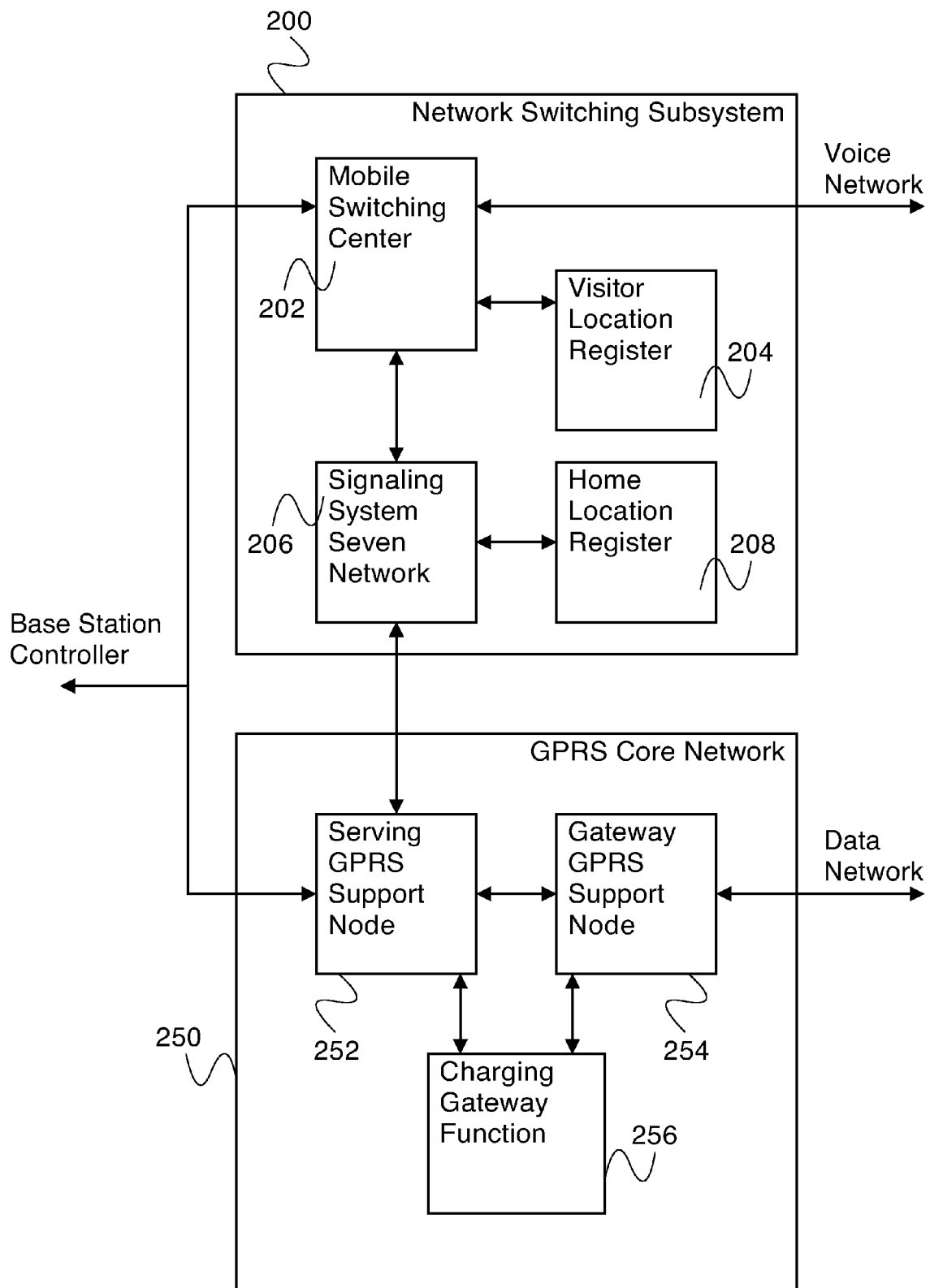
FIG. 2 is a block diagram illustrating an embodiment of a network switching subsystem.

FIG. 2 is a block diagram illustrating an embodiment of a network switching subsystem. In some embodiments, network switching subsystem 200 implements network switching subsystem 106 of FIG. 1. In the example shown, network switching subsystem 200 comprises mobile switching center 202, signaling system seven network 204, visitor location register 206, and home location register 208. Mobile switching center 202 controls (e.g., maintains the connection as a cellular device moves between base stations), sets up (e.g., accesses an external network to create a connection) and releases (e.g., accesses an external network to destroy a connection) a voice connection between a cellular device (e.g., cellular device 100 of FIG. 1) and another voice communication device (e.g., a voice communication device accessed through voice network 108 of FIG. 1). In some embodiments, mobile switching center 202 additionally tracks the time of the voice connection for the purpose of charging cellular device 100. Visitor location register 204 communicates with mobile switching center 202. In some embodiments, visitor location register 204 is integrated as a part of mobile switching center 202. Visitor location register 204 maintains a list of cellular devices that have roamed into the area served by mobile switching center 202 along with a set of attributes describing each cellular device. In the event that a connection needs to be made to a cellular device while it is roaming in the network served by mobile switching center 202 (e.g., the cellular device receives a phone call) the device attributes (e.g., type of device, current device location, device account type) are retrieved from visitor location register 204 in order to properly make the connection. Home location register 208 maintains a list of cellular devices whose home network is that of network switching system 200. In various embodiments, a cellular device home network comprises the network served by a single base station (e.g., base station 102 of FIG. 1), the network served by a single base station controller (e.g., base station controller 104 of FIG. 1), the network served by a plurality of base station controllers, the entire network of a cellular carrier, or any other appropriate network. When a device leaves its home network, the visitor location register for the network the device has roamed to communicates with the home location register in the home network for the device via signaling system seven network 206. In some embodiments, signaling system seven interfaces to a telephone network—for example, a national phone network, a wireline phone network, etc. When home location register 208 of the home network of the cellular device has confirmed to visitor location register 204 of the network the device has roamed to that it can allow the device to use its network (e.g., the network associated with home location register 208), the device is added to visitor location register 204, and mobile switching center 202 sets up the communication.

In some embodiments, GPRS core network 250 implements GPRS core network 110 of FIG. 1. In the example shown, GPRS core network 205 comprises serving GPRS support node (SGSN) 252, gateway GPRS support node (GGSN) 254, and charging gateway function 256. SGSN 252 sends data packets to and receives data packets from a cellular device (e.g., cellular device 100 of FIG. 1) and communicates data with GGSN 254. SGSN 252 also retrieves information about roaming devices by contacting home location register 208 of the home network of the roaming device, via signaling system seven network 206. GGSN 254 serves as an interface between GPRS core network 250 and an external data network (e.g., external data network 112 of FIG. 1). GGSN 254 communicates with SGSN 252 and with the external data network, and translates the data packets into the appropriate formats for the devices on each side. In some embodiments, there is more than one GGSN in a given GPRS core network, each GGSN connecting to the same SGSN. In some embodiments, each GGSN connects to the same external data network. In some embodiments, a plurality of GGSNs connect to one or more different data networks. Charging gateway function 256 communicates with SGSN 252 and GGSN 254 and tracks the total amount to charge each cellular device connected to GPRS core network 250.

Figure 3:
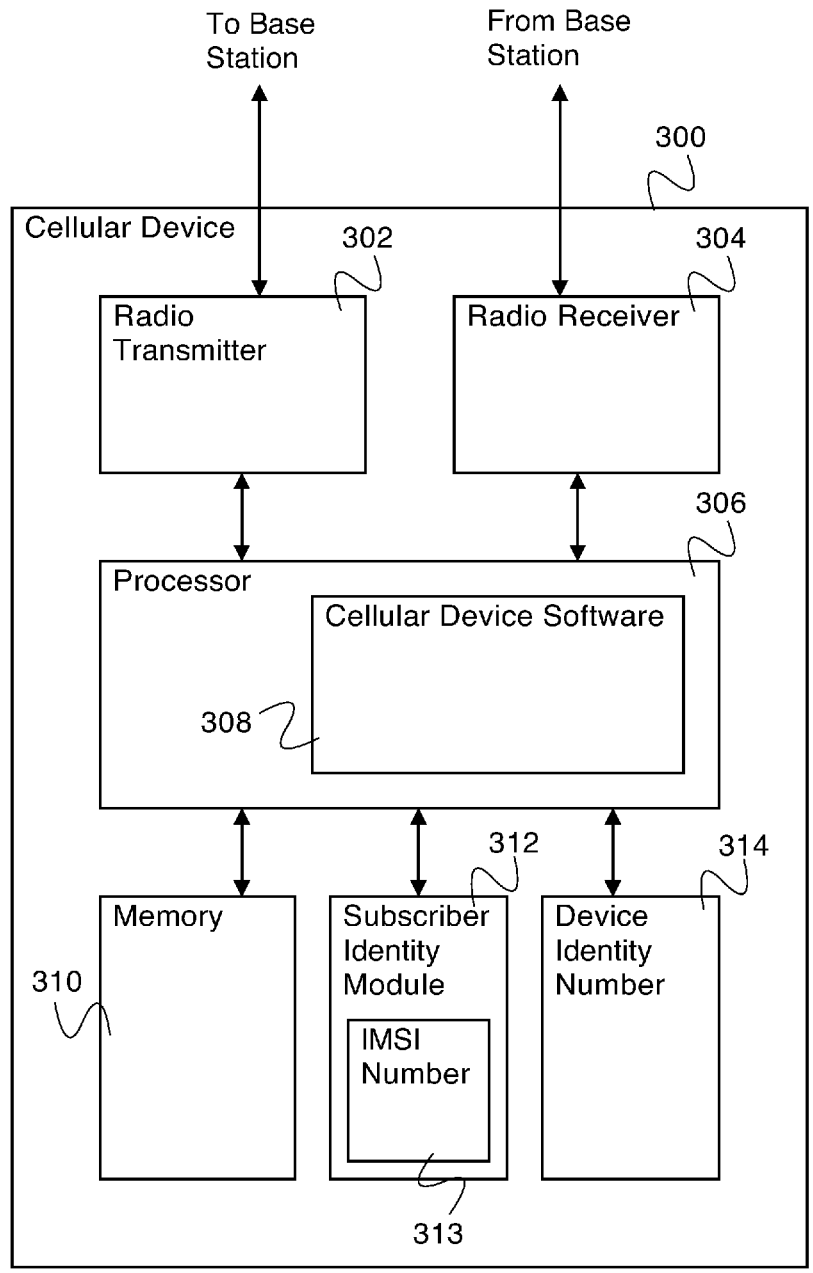
FIG. 3 is a block diagram illustrating an embodiment of a cellular device.

FIG. 3 is a block diagram illustrating an embodiment of a cellular device. In some embodiments, cellular device 300 comprises cellular device 100 of FIG. 1. In some embodiments, cellular device 300 enables automatic network reconfiguration. In the example shown, cellular device 300 comprises radio transmitter 302, radio receiver 304, processor 306, memory 310, subscriber identity module 312, and device identity number 314. Radio transmitter 302 and radio receiver 304 communicate with a base station (e.g., base station 102 of FIG. 1) using wireless radio communication. For example, radio transmitter 302 and radio receiver 304 communicate according to the GSM standard. In various embodiments, radio transmitter 302 and/or radio receiver 304 communicate using frequency modulated signals, phase modulated signals, amplitude modulated signals, time division multiplexing signals, code division multiplexing signals, or signals encoded using any other appropriate communication scheme or protocol. In various embodiments, radio transmitter 302 and/or radio receiver 304 communicate in the medium frequency band, the high frequency band, the very high frequency band, the ultra high frequency band, or any other appropriate frequency band. In various embodiments, radio transmitter 302 and/or radio receiver 304 communicate voice signals, data signals, text signals (e.g., short message service (SMS)), configuration and/or registration signals, or any other appropriate kinds of signals. Radio transmitter 302 and radio receiver 304 receive instructions and communicate data with the rest of cellular device 300 via processor 306. Processor 306 controls cellular device 300. Processor 306 communicates with radio transmitter 302 and radio receiver 304, as well as with memory 310, subscriber identity module 312, and device identity number 314. Processor 306 executes a set of instructions to control the device—for example, instructions in the form of software or code (e.g., designated as cellular device software 308 in FIG. 3). In some embodiments, cellular device software 308 is stored in semiconductor memory (e.g., random access memory, read only memory, programmable read only memory, memory 310, or any other appropriate storage for storing software for processing by a processor). In some embodiments, cellular device software 308 comprises a data network indicator for providing an indication when data network connectivity associated with a cellular network does not meet performance criteria. In some embodiments, cellular device software 308 comprises an automatic network reconfiguration module for automatically reconfiguring network data connectivity in the event that an indication has been provided that data network connectivity does not meet performance criteria or that network connectivity does not meet a configuration criteria (e.g., network cost, uptime, preferred supplier list, etc.). Memory 310 acts as temporary and/or long-term information storage for processor 306 as it is controlling cellular device 300. In some embodiments, a configuration file is stored in memory 310 as part of cellular device 300 comprising a list or prioritization of network(s) to connect to (e.g., voice networks and/or data networks). In some embodiments, a configuration file is stored as part of cellular device 300 and not as a part of subscriber identity module 312. In various embodiments, a configuration file comprises a prioritization based at least in part on cost, on network availability, on uptime, on data rate, on error statistics, or any other appropriate criteria for prioritization. Subscriber identity module (SIM) 312 comprises a removable module for an identity number that cellular device 300 uses to identify the user of cellular device 300 to the network. SIM 312 stores international subscriber identity module (IMSI) number 313. Device identity number 314 comprises an identity number uniquely identifying cellular device 300. In some embodiments, cellular device 300 does not store device identity number 314.

Figure 4:
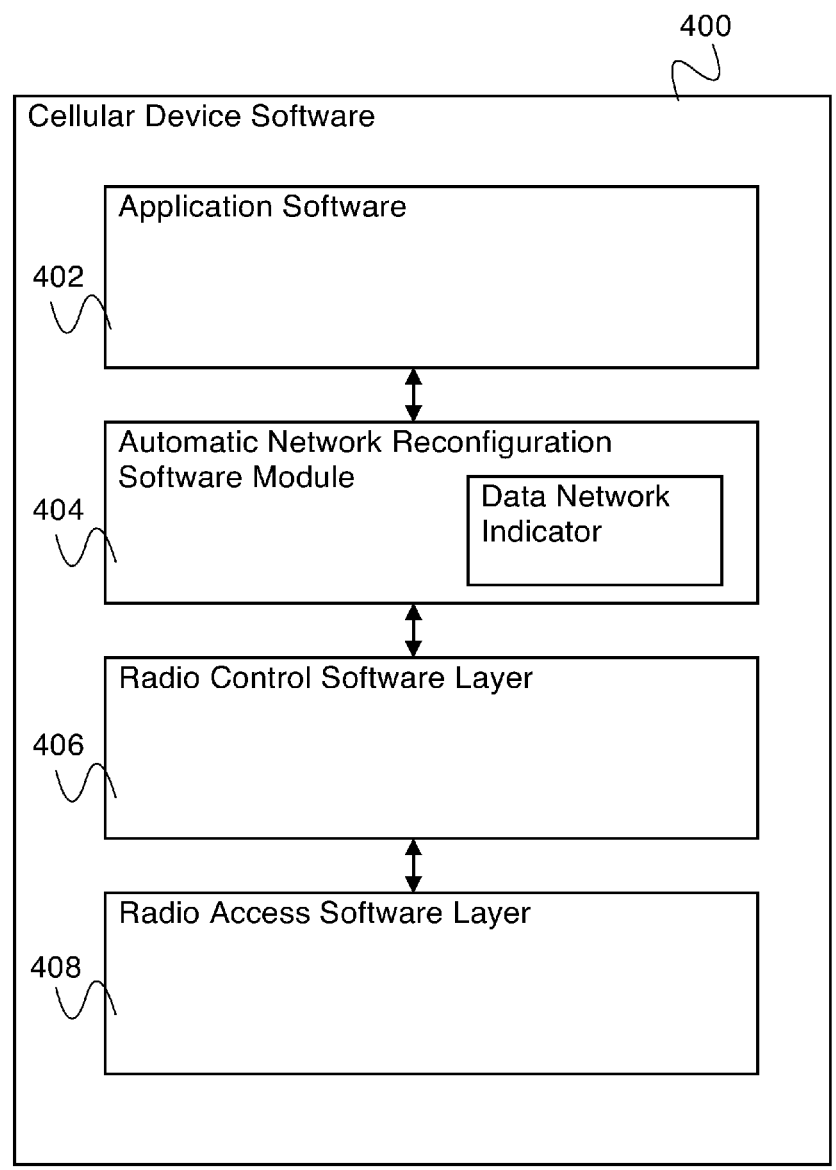
FIG. 4 is a block diagram illustrating an embodiment of cellular device software.

FIG. 4 is a block diagram illustrating an embodiment of cellular device software. In some embodiments, cellular device software 400 comprises cellular device software 308 of FIG. 3. Cellular device software 400 executes on a cellular device (e.g., a processor of cellular device 100 of FIG. 1). In the example shown, cellular device software 400 comprises application software 402, automatic network reconfiguration software module 404, radio control software layer 406, and radio access software layer 408. Application software 402 comprises software to control the basic cellular device functionality. In various embodiments, application software 402 comprises software to command the radio transmitter and receiver, to control the user interface, or to perform any other appropriate device functionality. Radio control software layer 406 acts as an interface to the radio for application software 402. Radio control software layer 406 comprises software to receive, interpret, and act on radio commands from application software 402, and to receive, interpret, and act on messages from radio access software layer 408. Radio access software layer 408 acts as the basic control of the radio transmitter (e.g., radio transmitter 302 of FIG. 3) and receiver (e.g., radio receiver 304 of FIG. 3). In various embodiments, radio access software layer 408 comprises software to register with a wireless voice network, to register with a wireless data network, to establish voice connections, to establish data connections, to send and receive messages (e.g., SMS, USSD, CBS, CSD, or a message over a voice network, etc.), or to perform any other appropriate radio access functionality.

Automatic network reconfiguration software module 404 acts as an intermediary between application software 402 and radio control software layer 404. In various embodiments, automatic network reconfiguration software module 404 comprises software to pass messages and commands between application software 402 and radio control software layer 406 unchanged, to interpret the status of the wireless voice and data connection, to issue commands to radio control software layer 406 to retry connection to a wireless voice and data network, to issue commands to radio control software layer 406 to establish a connection with a new wireless voice and data network, to access the wireless diagnostic radio channel, or to perform any other appropriate automatic network reconfiguration functionality. In the example shown, automatic network reconfiguration software module 404 passes commands and messages between application software 402 and radio control software layer 406 and determines the status of the wireless voice and data connection based on the commands and messages being passed. If automatic network reconfiguration software module 404 determines that the wireless voice or data connection has been lost, is of higher cost relative to another available connection, is not a connection associated with a preferred carrier (e.g., a carrier with greater coverage, lower cost, higher bandwidth, lower latency, fewer dropped connections, etc.), or is of unacceptable quality (e.g., cannot handle traffic bursts, poor data rate, noisy, uptime inadequate, etc.), it issues a command to radio control software layer 406 to attempt to fix the connection. In various embodiments, performance and/or configuration criteria comprise one or more of the following: data connectivity with bandwidth below a predetermined value, no data connectivity, data connectivity cost above predetermined rate value, data connectivity not with a preferred network provider, data connectivity unable to handle burst traffic, data connectivity uptime not better than predetermined value, data connectivity drop rate above predetermined value, and/or any other appropriate criteria. In various embodiments, when there is a network problem or the network connectivity does not meet performance criteria, automatic network reconfiguration software module issues a command to reconnect to the data network, to reconnect to the voice network, to connect to a different data network, to connect to a different voice and data network, to access the management channel, or to perform any other appropriate automatic reconfiguration action. In some embodiments, automatic network reconfiguration software module 404 additionally comprises an alternative network list, comprising a list of networks that can be tried in the event that the wireless data network connectivity is lost. In various embodiments, the alternative network list comprises a list of alternative voice networks with data overlay that can be accessed, a list of alternative routes for data network connectivity (e.g., using an alternative GGSNs) that can be accessed on the current voice network, or any other appropriate alternative networks. In some embodiments, a data network indicator indicates whether network connectivity meets or does not meet a network performance criteria.

In some embodiments, automatic network reconfiguration module 404 is designed as an integral part of cellular device software 400. In some embodiments, automatic network reconfiguration module 404 is designed separately from application software 402, radio control software layer 406 and radio access software layer 408, and is integrated after development. In some embodiments, automatic network reconfiguration module 404 is integrated with the other parts of cellular device software 400 by the cellular device software developer, and cellular device software 400 is loaded onto the cellular device as a single unit. In some embodiments, automatic network reconfiguration software 404 is loaded onto the cellular device separately from the other parts of cellular device software 400. In some embodiments, automatic network reconfiguration software 404 is downloaded and installed onto a functioning cellular device.

Figure 5:
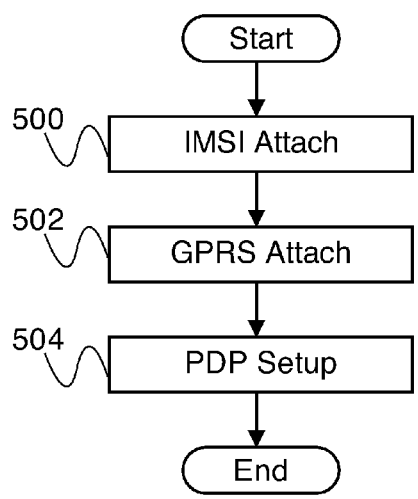
FIG. 5 is a flow diagram illustrating an embodiment of a wireless voice and data registration process.

FIG. 5 is a flow diagram illustrating an embodiment of a wireless voice and data registration process. In some embodiments, the process of FIG. 5 is performed by a cellular device (e.g., cellular device 100 of FIG. 1) when joining a wireless voice and data network (e.g., the wireless voice and data network of FIG. 1). In the example shown, in 500, a cellular device performs an IMSI attach procedure. In some embodiments, the IMSI attach procedure comprises transmitting the device IMSI number (e.g., the IMSI number 313 of FIG. 3) via a wireless network to a mobile switching center (e.g., mobile switching center 202 of FIG. 2) and registering an IMSI number with a visitor location register (e.g., visitor location register 204 of FIG. 2). In 502, the cellular device performs a GPRS attach procedure. In some embodiments, a GPRS attach procedure comprises transmitting a GPRS attach request via a wireless network to a SGSN (e.g., SGSN 252 of FIG. 2) and registering a device IMSI number with a SGSN. In 504, the cellular device performs a packet data protocol (PDP) setup procedure. In some embodiments, the PDP setup procedure comprises transmitting a PDP setup request along with a desired network to a SGSN. The SGSN transmits a request to the appropriate GGSN (e.g., GGSN 254 of FIG. 2) to set up a PDP session on its data network. The GGSN then sets up a session and creates a connection through the SGSN from the cellular device to the newly set up session on the data network.

Figure 6:
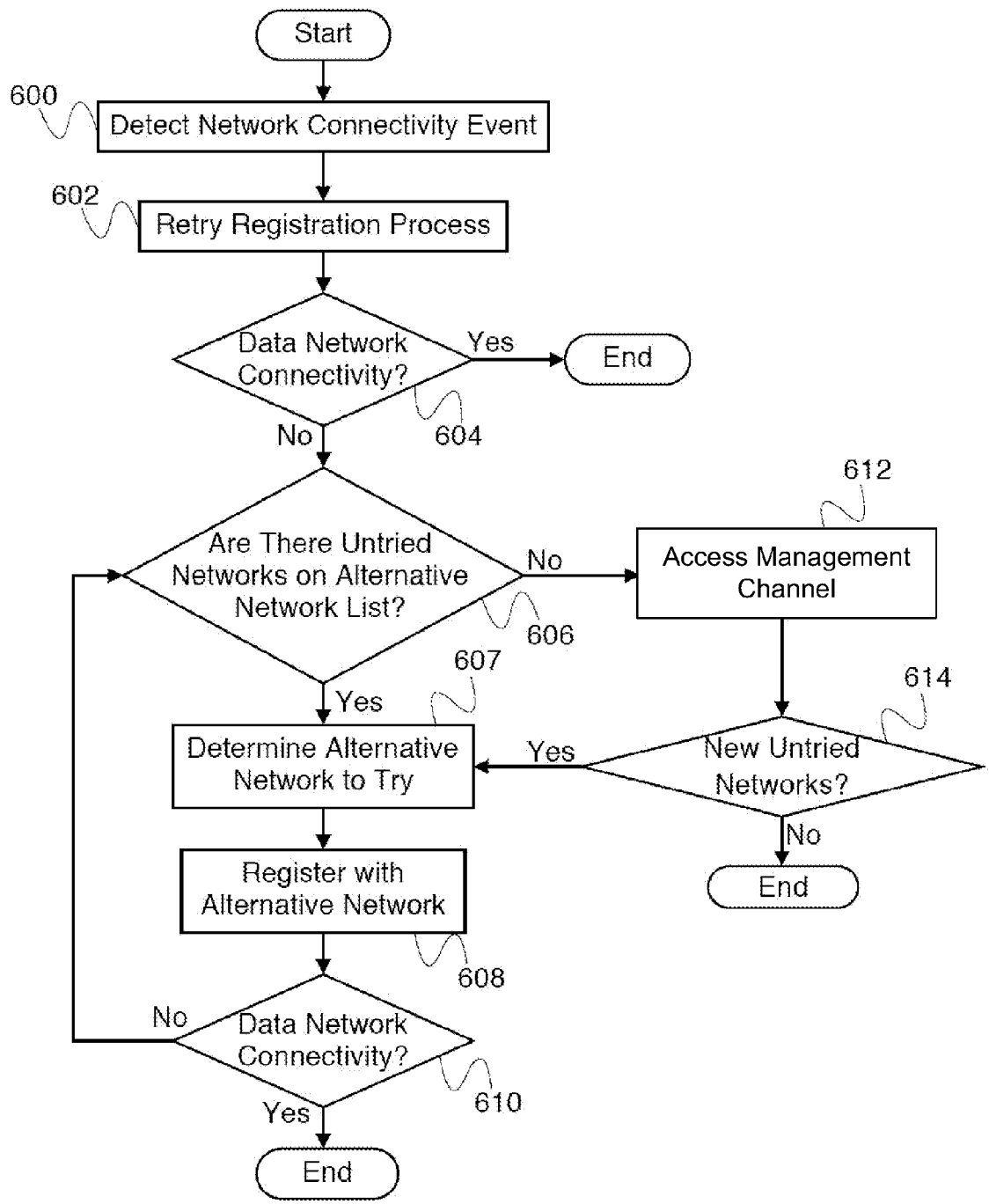
FIG. 6 is a flow diagram illustrating an embodiment of a process for automatic network reconfiguration.

FIG. 6 is a flow diagram illustrating an embodiment of a process for automatic network reconfiguration. In some embodiments, the process of FIG. 6 is performed by automatic reconfiguration software module 404 of FIG. 4, running on a cellular device (e.g., cellular device 100 of FIG. 1) in a wireless voice and data network (e.g., the wireless voice and data network of FIG. 1). In the example shown, in 600, the software module detects a network connectivity event. An event comprises a set of circumstances indicating a reconfiguration is to be performed. In various embodiments, an event comprises a set of circumstances indicating one or more of the following: a loss of data and/or voice connectivity, an available lower cost data or voice connectivity, an available higher performance data or voice connectivity (e.g., more uptime, lower latency, higher bandwidth, fewer drops, greater coverage, etc.), a preferred carrier availability, does not meet a performance or configuration criteria, or any other appropriate set of circumstances. In various embodiments, performance or configuration criteria comprise one or more of the following: data connectivity with bandwidth below a predetermined value, no data connectivity, data connectivity cost above predetermined rate value, data connectivity not with a preferred network provider, data connectivity unable to handle burst traffic, data connectivity uptime not better than predetermined value, data connectivity latency above predetermined value, data connectivity drop rate above predetermined value, and/or any other appropriate criteria. In various embodiments, the loss of data network connectivity is due to loss of connectivity between the cellular device and the base station (e.g., base station 102 of FIG. 1), between the SGSN (e.g., SGSN 252 of FIG. 2) and the GGSN (e.g., GGSN 254 of FIG. 2), between the GGSN and the data network (e.g., data network 112 of FIG. 1), or due to a loss of connectivity at any other point in the data path. In some embodiments, the loss of connectivity is due to a loss of registration on the data network (e.g., GPRS core network 110 of FIG. 1). In some embodiments, the loss of connectivity is due to a loss of registration on the voice network (e.g., network switching subsystem 106 of FIG. 1). In some embodiments, the loss of connectivity is due to a loss of the PDP session (e.g., the PDP session established in 504 of FIG. 5). In various embodiments, the automatic network reconfiguration software detects the loss of data network connectivity by one or more of the following: monitoring signals passed between the application software (e.g., application software 402 of FIG. 4) and the radio control software layer (e.g., radio control software layer 406 of FIG. 4), monitoring the rate of data passing from the radio control software layer to the application software, monitoring the voice and data network registration status in the radio access software layer (e.g., radio access software layer 408 of FIG. 4), monitoring an external data network connection status indicator (not shown), or any other appropriate method for detecting loss of data network connectivity. In 602, a registration process (e.g., the wireless voice and data registration process of FIG. 5) is retried. In various embodiments, retrying the registration process comprises starting the registration process over from an IMSI attach procedure (e.g., IMSI attach procedure 500 of FIG. 5), starting the registration process over from a GPRS attach procedure (e.g., GPRS attach procedure 502 of FIG. 5), starting the registration process over from a PDP setup procedure (e.g., PDP setup procedure 504 of FIG. 5), or starting the registration process over from any other appropriate point in the registration process.

In 604, the data network connectivity is evaluated. If the data network has connectivity, the registration process was successful, and the process ends. In some embodiments, if the data network has connectivity, data network desirability is also evaluated. If data network desirability is above a certain threshold, the registration process was successful, and the process ends. If the data network still does not satisfy one or more connectivity criteria, control passes to 606. In 606, an alternative network list (e.g., the alternative network list comprised in automatic reconfiguration software module 404 of FIG. 4) is examined for untried networks. If there are untried networks on the alternative network list, control passes to 607. In 607, the automatic reconfiguration software module automatically determines an alternative network to try. In various embodiments, the alternative network to try is determined based at ;east in part on one or more of the following: a network uptime (e.g., a maximum, a minimum, a specific, or an average network uptime), a network bandwidth (e.g., a maximum, a minimum, a specific, or an average network bandwidth), a network latency (e.g., a maximum, a minimum, a specific, or an average network latency), a network cost (e.g., a maximum, a minimum, a specific, or an average network cost), or based on any other appropriate network metric. In 608, the automatic reconfiguration software module registers with the alternative network from the alternative network list. In some embodiments, the alternative network from the alternative network list comprises a new route to the data network on the current cellular network (i.e., an alternative GGSN), and registering with the alternative network comprises restarting the PDP setup procedure using the alternative GGSN. In some embodiments, the alternative network from the alternative network list comprises a new voice network, and registering with the alternative network comprises restarting the network registration process from the IMSI attach procedure. In 610, the data network connectivity is evaluated. If the data network has connectivity, the registration process was successful, and the process ends. In some embodiments, if the data network has connectivity, data network desirability is also evaluated. If data network desirability is above a certain threshold, the registration process was successful, and the process ends. If the data network still does not satisfy one or more connectivity criteria, control passes back to 606. If there are still untried alternative networks on the alternative network list, the process then repeats. In 606, if there are no remaining untried networks on the alternative network list, control passes to 612. In 612, the automatic network reconfiguration software accesses the management channel. The automatic network reconfiguration software uses the management channel to update its alternative network list. In 614, the automatic network reconfiguration software checks if it has new untried networks on the alternative network list. If new untried networks were added to the alternative network list when the management channel was accessed, control passes to 608, where the software attempts to setup the new network. If new untried networks were not added to the alternative network list when the diagnostic channel was accessed, the automatic network reconfiguration software has exhausted all of its options, and the process ends.

Figure 7:
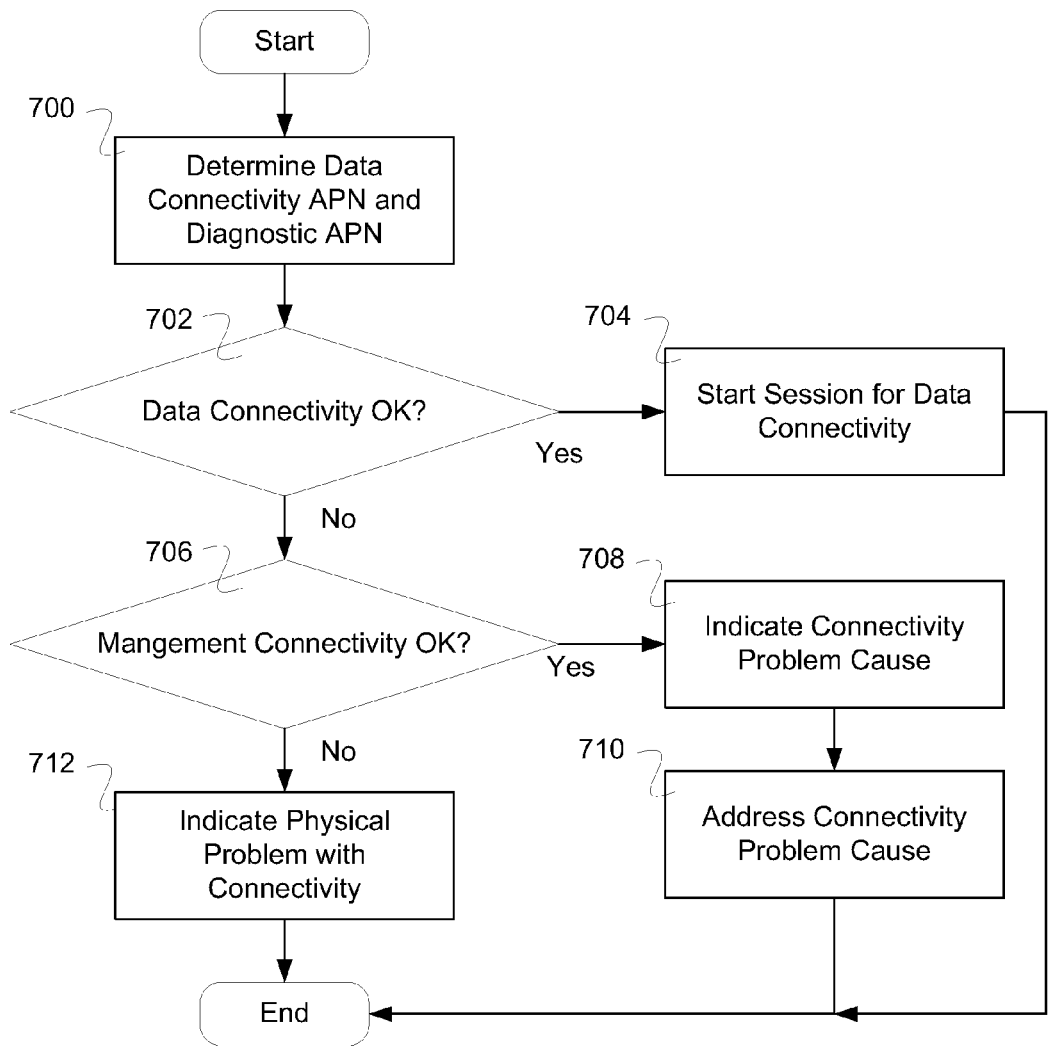
FIG. 7 is a flow diagram illustrating an embodiment of a process using a management channel.

FIG. 7 is a flow diagram illustrating an embodiment of a process using a management channel. In some embodiments, the process of FIG. 7 is part of 504 of FIG. 5. In the example shown, in 700 a data connectivity APN and a diagnostic APN are determined. In 702, it is determined if data connectivity is OK. In the event that data connectivity is OK, then in 704 a session for data connectivity is started. In the event that data connectivity is not OK, then in 706 it is determined if management connectivity is OK. In the event that management connectivity is OK, then in 708 a connectivity cause is indicated. In various embodiments, the connectivity cause comprises an unpaid account balance, a terminated contract, an account freeze, an unactivated subscription, or any other appropriate connectivity cause. Note that in the event that management connectivity is achieved, the likelihood of a hardware or other technical difficulty with connectivity is diminished since the management connectivity is operational. In 710, connectivity problem cause is addressed, and the process ends. In various embodiments, a payment on a delinquent account is provided (e.g., by paying using a credit card), an account issue is cleared by communicating with a user or by running through a connectivity problem protocol with a customer support representative, or any other appropriate address of a problem cause. In the event that management connectivity is not OK, then in 712 a physical problem is indicated with the connectivity, and the process ends. In some embodiments, a technical connectivity problem is indicated that is not physical.

In some embodiments, the use of the management connectivity is determined by the application running on a mobile device. In various embodiments, the use of the management channel is not charged, is charged at a different price point, is charged at a regular price point, or any other appropriate cost structure. In various embodiments, the management channel connectivity comprises data connectivity using one or more of the following: a SMS channel, a data channel, a USSD channel, a CSD channel, a CBS channel, a voice channel, and/or any other appropriate data connectivity.

In some embodiments, a device has multiple logical channels on the mobile network—the secondary (e.g., management channel) logical channel is invisible to the user, and, in some embodiments, any communication over that channel is not billable. The primary channel is available only when the user has a valid subscription (e.g., a data channel or subscription channel); the secondary channel is available to a user's device (e.g., by an application running on the device) regardless of whether the subscription is valid (e.g., diagnostic channel). This secondary channel is used for administrative maintenance and performance tuning (e.g., software upgrading, configuration upgrading, etc.), such as diagnostics troubleshooting, logging (e.g., packet loss experienced, higher-than-expected delay in communication, duplicate packets, etc.) and reporting (e.g., experienced network bandwidth and latency, coverage presence/absence in different geographies etc.), and subscription management. In some embodiments, a configuration file for network prioritization is loaded to the device using the secondary channel. In various embodiments, prioritization is based at least in part on network performance (e.g., uptime, dropped call statistics, signal strengths, etc.), network cost, network affiliation, or any other appropriate network parameter.

In some embodiments, a laptop or personal navigation device (PND) comes with built-in modem (e.g., a third generation standard cell phone (3G phone)) plus some period of time subscription to a network service (e.g., three, six, or 12 months of service included). After the initial subscription, a customer must pay for network services. In the event that services lapse and it is desired that the services become re-enabled, using a management channel a user can engage subscription management services without using a separate communication channel (e.g., a phone call, a separate internet connection, a separate cell connection, etc.). Using the device with management channel, a user will be able to subscribe to network services either on a temporary or long term basis (e.g., a 1-hour plan, a 1-day plan, a by the hour plan, a monthly plan, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing cellular network devices in a cellular network comprising:
   a processor; and
   a memory coupled with the processor, wherein the memory is configured to provide the processor with instructions which when executed cause the processor to:
      receive reconfiguration information from a cellular network device through the cellular network via a cellular tower and a base station controller through a management channel that is available to the cellular network device not having a subscription to the cellular network, wherein the reconfiguration information comprises diagnostic, connection management, or subscription management information to restore or improve data network connectivity;

retrieve diagnostic information associated with a connectivity problem associated with the cellular network device from the cellular network comprising verifying wireless device connectivity with the cellular network by checking a home location register (HLR) for wireless signaling activity including at least one of a GSM authorization request, a mobile switching center (MSC) location update, and a serving GPRS support node (SGSN) location update;

determine at least one solution for the connectivity problem associated with the cellular network device based on the retrieved diagnostic information from the cellular network and the reconfiguration information from the cellular network device; and transmit the at least one solution utilizing the management channel to the cellular network device.

2. The system as in claim 1, wherein the management channel is used to update a list of alternative networks.

3. The system as in claim 1, wherein transmissions accessing the management channel are marked as privileged.

4. The system as in claim 3, wherein privileged transmissions are marked by one or more of the following: changing the subscriber identity of the cellular network device, changing an access point name the cellular device connects to, changing the user name the cellular device connects with, indicating a specific set of destinations devices can connect to and have their transmissions automatically marked as privileged, and marking any transmission from a cellular device in a disconnected state as privileged and rerouting it to a specific destination.

5. The system as in claim 1, wherein the connectivity problem is associated with at least one of an unpaid account balance, a terminated contract, an account freeze, an unactivated subscription, a billing issue, a subscription issue, and a software issue.

6. The system as in claim 1, wherein the at least one solution comprises at least one of a payment on a delinquent account is provided, an account issue is cleared by communicating with a user, an account issue is cleared by administering a connectivity problem protocol with a customer support representative.

* * * * *